United States Patent [19]

Bonati

[11] 3,764,618

[45] Oct. 9, 1973

[54] ALUMINUM SALTS OF 3-ACETYL-18β-GLYCYRRHETINIC ACID

[75] Inventor: Attilio Bonati, Milan, Italy

[73] Assignee: Dott. Inverni & Della Beffa S.p.A., Milan, Italy

[22] Filed: Oct. 27, 1970

[21] Appl. No.: 84,911

[52] U.S. Cl. .......... 260/448 R, 260/514.5, 424/296, 424/317
[51] Int. Cl. ............................................. C07f 5/06
[58] Field of Search ................................. 260/448 R

[56] References Cited
FOREIGN PATENTS OR APPLICATIONS
950,777   2/1964   Great Britain

OTHER PUBLICATIONS

Chemical Abstracts, Vol. 73, 64754p (1970).

*Primary Examiner*—Helen M. S. Sneed
*Attorney*—Browdy & Neimark

[57] ABSTRACT

Aluminum salts of 3-acetyl-18β-glycyrrhetinic acid are prepared by reacting the acid with alcoholates of aluminum and are useful primarily in treating disorders of the alimentary canal such as, for example, gastric ulcers.

4 Claims, No Drawings

ALUMINUM SALTS OF 3-ACETYL-18β-GLYCYRRHETINIC ACID

This invention relates to novel acetyl-compounds-glycyrrhetinic anti-inflammatory properties of the antacid.

In accordance with the invention it has been found that salts of 3-acetyl-18β-glycyrrhetinic acid with aluminum possess optimum healing and anti-inflammatory properties which are very useful in the treatment of disorders of the alimentary canal such as gastric and duodenal ulcers, gastritis and gastroduodenitis, particularly such disorders caused by medicaments. These substances may moreover be employed in the therapy of pharyngitic, pharyngotracheitis, corneal ulcers, colitis (especially ulcerative colitis), dermatitis, dormatosis, decubitus ulcers, dormant ulcers, varicose ulcers, rhagades, haemorrhoids and erosions of the epithelium of the female genital passages.

The salts of 3-acetyl-b18β-glycyrrehetinic acid which are referred to are novel and possess not only the healing, anti-ulcer and anti-i nflammatory properties of the free acid, but also the pharmacological properites of aluminum, in particular the antiacid action.

Thus in accordance with one aspect of the present invention there are provided aluminum salts of 3-acetyl-18β-glycyrrhetinic acid of the formula $$Al(Glyc.)_{3-x}(OR)_x$$

wherein Glyc. represents a 3-acetyl-18β-glycyrrhetinate group; OR represents a group selected from the group consisting of hydroxy and alkoxy; and $x$ is 0 or a positive integer less than 3.

The invention also includes pharmaceutical preparations containing an aluminum salt of 3-acetyl-18β-glycyrrhetinic acid. These preparations comprise a diluent or carrier for the active ingredients and may in addition contain other drugs. Useful excipients include starch, talc, sodium alginate and magnesium stearate. The preparations may be administered in the form of tablets or suppositories, or as powders or ointments. The pharmaceutical preparations may also include anti-acids such as aluminum hydroxide, glycine and aluminum silicate.

The new salts of 3-acetyl-18β-glycyrrhetinic acid can be prepared by reaction between 3-acetyl-18β-glycyrrhetinic acid and an aluminum alcoholate. Preferably lower alcoholates are used, i.e. alcoholates in which the alkoxy group or groups have from one to four carbon atoms. The salification reaction may be carried out at room temperature or at an elevated temperature in conventional fashion, preferably in the presence of organic solvents. As organic solvents may be used alcohols, ethers, ketones, chlorinated solvents (methylene chloride, chloroform) ethyl acetate etc.

Since the metal has a valency greater than one, it is possible to obtain a neutral salt or a basic salt, according to the ratio of the reactants.

The basic salts obtained may be represented by the formula $$Al(Glyc.)_{3-x}(OR)_x,$$

where R is hydrogen or an alkyl group corresponding to the alkoxy group of the alcoholate used in the preparation of the salt and "Glyc." represents a 3-acetyl-18β-glycyrrhetinate group and x is 1 or 2. The basic salts containing alkoxy groups may be obtained by carrying out the salification reaction in the absence of water. If required these basic salts may be converted to basic salts containing hydroxyl groups (i.e., R = H in the above formula) by contacting the salts with the stoichiometric requirement of water. Alternatively the basic salts containing hydroxyl groups may be produced by carrying out the salification reaction in the presence of water.

Thus, it has been possible to obtain aluminum mono-, di- and tri-3-acetyl-18β-glycyrrhetinate, in the case of the mono- and di- salts the remaining valencies of the aluminum may be satisfied by hydroxyl and/or alkoxy groups.

In many cases, the solubility of these new salts in organic solvents is very high, while the solubility in water is generally very low.

As a general rule, the solubility of the salts of 3-acetyl-18β-glycyrrhetinic acid, i.e. increases from the basic salts to the neutral salts: aluminum tri-3-acetyl-18β-glycyrrhetinate is much more soluble in chloroform than aluminum mono-3-acetyl-18β-glycyrrhetinate.

Pharmacological data.

In these experiments, reference is made to the following publications by number:

1. Litchfield J.T. and Wilcoxon F.J. Pharmacol. exp. Ther.96, 99,1949
2. Shay H., Kamarov S.A., Fels S.S., Meranze D., Gruenstein M. and Spilet M.; Gastroenterology 5, 43, 1945.
3. Keyrilainen T.O. and Passonen M.K.; Acta Pharmacol. et toxicol, 13, 22, 1957
4. Winter C.A., Risley E.A. and Nuss G.W.; Proc. Exp. Biol. Med. 3, 544, 1962
5. Van Arman C.G., Begany A.J. = Miller L.M. and Pless H.H.; J. Pharm. Exp. Ther., 150, 328, 1965
6. Cahen R., Pessonier A.; C.R.Soc. Biol. 157, 477, 1963
7. Bonfils S., Lefooghe S., Rossi C, and Lambling A.: C.R. Soc. Biol. 151 1149, 1957.

Toxicity

This was studied in male rats of the Sprague-Dawley strain weighing 220 – 290 g by oral and intraperitoneal administration, observation being extended for a duration of 10 days.

The LD 50 was evaluated by the Litchfield and Wilcoxon method (1).

Tables 1 and 2 show the values of the LD 50 obtained in rats by the oral and intraperitoneal methods, respectively.

TABLE 1

| Product | Animals treated | LD 50 mg/kg |
|---|---|---|
| 3-acetyl-18β-glycyrrhetinic acid | 20 | > 3300 |
| Aluminum tri-3-acetyl-18β-glycyrrhetinate | 20 | > 3300 |

TABLE 2

| Product | Animals treated | LD 50 mg/kg |
|---|---|---|
| 3-acetyl-18β-glycyrrhetinic acid | 40 | > 3300 |

TABLE 2—Continued

| | | |
|---|---|---|
| Aluminum tri-3-acetyl-18β-glycyrrhetinate | 40 | > 3300 |

Anti-ulcer activity

This was studied by comparison of experimental ulcers produced by ligature of the pylorus, according to Shay (2).

Ligature of the pylorus was carried out under light anaesthesia with ether on rates which had been kept fasting for 48 hours in single cages with water ad libitum. The rats were replaced in the cages without food and without water, and were killed 17 hours later. The stomach was opened along the lower bend and examined to determine the formation of ulcers therein in accordance with the following standard of classification proposed by Keyrilainen and Passonen (3).

Class I — small ulcers 0.2 mm = value 1
Class II — medium ulcers 2-5 mm = value 5
Class III — large ulcers 5-10 mm = value 10
Class IV — very large ulcers >10 mm = value 20
Perforation = value 20

There were than calculated: the ulcer index =sum of the values of all the classes/number of animals, the percentage variations of the ulcer index of the rats treated with respect to the controls, and the number of stomachs protected from the formation of ulcers, those having not more than two small ulcers being regarded as such.

The administration of the substances was effected by gastric probe and was repeated three times, 48 and 24 hours prior to the ligature of the pylorus and immediately after the operation.

Each of the substances examined, suspended in gum arabic, was administered to groups of 10 – 13 rats.

The data obtained are summarised in Table 3.

Activity on the repair of gastric ulcers

The Cahen and Passonier technique (6) was used.

Male rats with a weight between 180 and 230 g and without food for 16 hours were subjected to restraint for a period of 24 hours by the methods of Bonfils et al (7)

The substances were administered orally, with the doses fixed and divided in two in the course of the day; half in the morning and half in the evening.

Rats to which the vehicle of the substances under examination, constituted by gum arabic in a concentration of 10% in water was administered, were kept as control.

The treatments were continued for 1 – 8 days.

In groups of 8 at a time, the animals were killed by decapitation 24 hours, 3, 6 and 9 days after the cessation of the immobilization, 12 hours after the last administration of the drugs.

The stomachs were removed from the animals killed immediately after the period of immobilization (check on the ulcerogenic effectiveness of this period) or at the above-indicated times after the cessation of the restraint, were washed with physiological solution and the mucous membrane was then examined.

Account was taken of the number of unhealed ulcers (U) and of the number of ulcers healed or in a stage of repair (UH).

An ulcer index based on the ratio between the number of ulcers present in the stomachs examined and the number of animals killed at each of the above-indicated times was calculated.

TABLE 3

| Treatment | Doses/kg.[1] | No. of rats | Number of ulcers for the various classes[2] | | | | | Ulcer index | Variation of ulcer index (percent) | No. of stomachs not ulcerated (percent) |
|---|---|---|---|---|---|---|---|---|---|---|
| | | | I | II | III | IV | V | | | |
| Controls (10% aqueous gum arabic) | 20 ml | 13 | 138 (138) | 43 (215) | 19 (190) | 23 (460) | 1 (20) | 78.6 | — | — |
| 3-acetyl-18β-glycyrrhetinic acid | 436 mg | 10 | 37 (37) | 16 (80) | 3 (30) | 1 (20) | 0 | 16.7 | −78 | 30 |
| Aluminum tri-3-acetyl-18β-glycrrhetinate. | 436 mg | 13 | 72 (72) | 9 (45) | 0 | 0 | 0 | 9 | −88 | 23 |

[1] Dose administered orally three times: 48 and 24 hours before the ligature of the pylorus and immediately after the operation.
[2] In brackets, the number of ulcers multiplied by the value of the various classes, in accordance with the standard of evaluation described in the methods.

TABLE 4
ACTION OF 3-ACETYL-18β-GLYCYRRHETINIC ACID AND OF ALUMINUM TRI-3-ACETYL-18β-GLYCYRRHETINATE ON THE SPONTANEOUS REGRESSION OF IMMOBILIZATION-INDUCED ULCERS

| Treatment | Oral doses mg./kg.[1] | No. of animals | Ulcer index at the end of the immobilization after the following numbers of days[2] | | | | | | | | | |
|---|---|---|---|---|---|---|---|---|---|---|---|---|
| | | | 0 | | 1 | | 3 | | 6 | | 9 | |
| | | | U | UH | U | UH | U | UH | U | UH | U | UH |
| Controls (gum arabic in concentration of 10% in water). | 2ml./100 g | 8 | 6.5 | 0 | 1.7 | 0.3 | 1.7 | 0.5 | 0.2 | 1.1 | 0 | 1.6 |
| 3-acetyl-18β-glycyrrhetinic acid | 436 | 8 | 6.8 | 0 | 0.6 | 4.2 | 0.2 | 1.2 | 0 | 1.6 | 0 | 1.7 |
| Aluminum tri-3-acetyl-18β-glycyrrhetinate | 436 | 8 | 6.0 | 0 | 0.1 | 3.0 | 0 | 1.6 | 0 | 1.5 | 0 | 2.3 |

U — Ulcers not healed.
UH — Ulcers healed.
[1] Doses administered in two portions: half in the morning and half in the evening.
[2] Number of ulcers present in the stomachs divided by the number of animals killed.

Anti-inflammatory activity

The study of the anti-inflammatory activity was conducted in rats by testing the oedema of the paw induced both by carrageenin according to Winter et al (4) and by brewer's yeast according to Van Arman et al (5). The substances under examination were administered intraperitoneally.

The results obtained are compiled in the following Tables.

INHIBITION OF OEDEMA CAUSED BY CARRAGEENIN

| Treatment | Doses mg./kg.[1] | No. of animals | Oedema (ml. ±E.S.)[2] | Inhibition of the oedema (percent) | Significance[3] |
|---|---|---|---|---|---|
| Controls | — | 8 | 0.31 ± 0.007 | — | — |
| 3-acetyl 18β-glycyrrhetinic acid | 33 | 8 | 0.17 ± 0.001 | 45 | $P < 0.001$ |
|  | 109 | 8 | 0.04 ± 0.003 | 87 | $P < 0.001$ |
| Controls | — | 8 | 0.28 ± 0.007 | — | — |
| Aluminum tri-3-acetyl-18β-glycyrrhetinate | 33 | 8 | 0.17 ± 0.007 | 39 | $P > 0.001$ |
|  | 109 | 8 | 0.14 ± 0.01 | 50 | $P > 0.001$ |

[1] Dose administered intraperitioneally twice: 30 minutes before and 1 hour after the subplantar injection of carrageenin (0.1 ml. of a 1 percent suspension).
[2] Average volume of the oedema, measured 3 hours after the injection of carrageenin, the time in which the maximum volume of the oedema occurred in the controls.
[3] Significance, deduced from Student's "$t$" calculated with respect to the average obtained with the controls.

INHIBITION OF OEDEMA CAUSED BY BREWER'S YEAST

| Treatment | Doses mg./kg.[1] | No. of animals | Oedema (ml. ±E.S.)[2] | Inhibition of the oedema (percent) | Significance[3] |
|---|---|---|---|---|---|
| controls | — | 8 | 0.31 ± 0.003 | — | — |
| 3-acetyl-18β-glycyrrhetinic acid | 33 | 8 | 0.16 ± 0.01 | 48 | $P < 0.001$ |
|  | 109 | 8 | 0.07 ± 0.003 | 77 | $P < 0.001$ |
| Controls | — | 8 | 0.29 ± 0.003 | — | — |
| Aluminum tri-3-acetyl-18β-glycyrrhetinate | 33 | 8 | 0.13 ± 0.003 | 55 | $P < 0.001$ |
|  | 109 | 8 | 0.10 ± 0.003 | 65 | $P < 0.001$ |

[1] Doses administered intraperitoneally 30 minutes before the subplantar injection of brewer's yeast (0.1 ml. of a 2% suspension).
[2] Average volume of the oedema, measured 1 hour after the injection of brewer's yeast, the time in which the maximum volume of the oedema occurred in the controls.
[3] Significance deduced from Student's t calculated with respect to the average obtained with the controls.

The preparation of salts according to the invention is illustrated in the following Examples:

Example I

Preparation of aluminum tri-3-acetyl-18β-glycyrrhetinate 15.38 g of 3-acetyl-18β-glycyrrhetinic acid dissolved in 500 ml of chloroform were added to a solution of 2.04 g of aluminum isopropylate in 50 ml of chloroform.

After 1 hour, the chloroform solution was evaporated to dryness, and aluminum tri-3-acetyl-18β-glycyrrhetinate was obtained as a white powder, melting point 286°–290°C; $\alpha_D^{20} = 126° \pm 2°(c = 1, CHCl_3)$.

Example II

Preparation of aluminum tri-3-acetyl-glycyrrhetinate: 4.08 g of aluminum isopropylate dissolved in 50 ml of methylene chloride were added to 30.76 g of 3-acetyl-18β-glycyrrhetinic acid, suspended in 200 ml of methylene chloride. Stir at room temperature up to complete solution, then evaporate to about 50 ml and pour into 200 ml of hexane. Filter the aluminum tri-3-acetyl-18β-glycyrrhetinate as white amorphous, light powder.

The following are examples of pharmaceutical formulations containing the compounds of the invention:

Tablets
- Aluminum tri-3-acetyl-18β-glycyrrhetinate — 50 mg
- Aluminum hydroxide — 400 mg
- Diluents selected from sodium alginate, magnesium stearate, talc and starch up to — 1.2 g Powder
- Aluminum tri-3-acetyl-18β-glycyrrhetinate — 3 g
- Aluminum hydroxide — 16 g
- Diluents selected from sodium alginate, talc, magnesium stearate, polyoxyethylene stearate, starch and lactose up to — 100 g Suppositories
- Aluminum tri-3-acetyl-18β-glycyrrhetinate — 100 mg
- Tri glycerides of fatty acids up to — 1,400 g Ointment
- Aluminum tri-3-acetyl-18β-glycyrrhetinate — 2 g
- Lidocaine hydrochloride — 2 g
- Distilled water — 14.8 g
- Methyl p-hydroxybenzoate — 0.2 g
- Diluents selected from polyethylene glycol 4,000, propylene glycol and cetyl alcohol up to — 100 g Suitable daily doses for humans of the compositions according to the present invention are from 100 to 500 milligrams of the aluminum salts.

I claim:

1. A salt having anti-inflammatory and healing properties of 3-acetyl-18β-glycyrrhetinic acid of the formula $$Al(Glyc.)_{3-x}(OR)_x$$

wherein Glyc. represents a 3-acetyl-18β-glycyrrhetinate group; OR represents a group selected from the group consisting of hydroxy and alkoxy; and $x$ is 0 or a positive integer less than 3.

2. Aluminum tri-3-acetyl-18β-glycyrrhetinate in accordance with claim 1.

3. An aluminum di-3-acetyl-18β-glycyrrhetinate in accordance with claim 1.

4. An aluminum mono-3-acetyl-18β-glycyrrhetinate in accordance with claim 1.

* * * * *